United States Patent [19]

Khanna et al.

[11] 4,035,440
[45] July 12, 1977

[54] BLEND OF THERMOPLASTIC POLYURETHANE ELASTOMER WITH CHLORINATED POLYETHYLENE

[75] Inventors: Som Nath Khanna; Mitchell Borr, both of Guelph, Canada

[73] Assignee: Uniroyal, Ltd., Canada

[21] Appl. No.: 345,922

[22] Filed: Mar. 29, 1973

[30] Foreign Application Priority Data

Mar. 19, 1973 Canada .................... 166375

[51] Int. Cl.$^2$ .................................... C08L 75/00
[52] U.S. Cl. .................. 260/859 R; 260/23 EP; 260/23 TN; 260/457 P; 260/836; 260/859 PV
[58] Field of Search .................. 260/859, 859 PV

[56] References Cited

U.S. PATENT DOCUMENTS

| 3,429,948 | 2/1969 | Massoubre | 260/859 R |
| 3,594,449 | 7/1971 | Binder | 260/859 R |

FOREIGN PATENT DOCUMENTS

| 1,119,041 | 7/1968 | United Kingdom | 260/859 |

Primary Examiner—Paul Lieberman
Attorney, Agent, or Firm—James J. Long

[57] ABSTRACT

Thermoplastic blends of a minor amount of chlorinated polyethylene with a major proportion of thermoplastic polyurethane elastomer have good processing and mold release properties. Thermoplastic blends of a minor amount of thermoplastic polyurethane elastomer with a major proportion of chlorinated polyethylene have good strength properties and processing characteristics. Sheets made from the blends have good vacuum-forming properties and low temperature flexibility.

1 Claim, No Drawings

BLEND OF THERMOPLASTIC POLYURETHANE ELASTOMER WITH CHLORINATED POLYETHYLENE

Copending application Ser. No. 345,924, now U.S. Pat. No. 3,882,191 of Balatoni et al., filed of even date herewith, discloses blends of thermoplastic polyurethane elastomer, polyvinyl chloride resin, and chlorinated polyethylene.

Copending application Ser. No. 345,923, now U.S. Pat. No. 3,929,928 of Wolf, Jr., et al., filed of even date herewith, discloses blends of thermoplastic polyurethane elastomer, chlorinated polyethylene, and certain additional thermoplastic resins.

This invention relates to a thermoplastic composition and shaped articles made therefrom.

Blends of thermosetting polyesterurethane and chlorinated polyethylene, cured with peroxide, are disclosed in U.S. Pat. 3,429,948, Massoubre, Feb. 25, 1969. The thermosetting polyesterurethane employed is a low molecular weight polymer having terminal unsaturation and must be chain-extended and crosslinked to attain useful elastomeric properties. Similarly, U.S. Pat. 3,594,449, Binder, July 20, 1971, discloses thermosetting polyurethane (isocyanate-terminated) chain-extended, crosslinked and coreacted with chlorinated polyethylene, simultaneously, using organic diamines. The present invention, in contrast, is directed to thermoplastic compositions, suitable, for example, in making sheets which can be vacuum formed into useful articles. A thermoplastic polyurethane (having practically zero -NCO content) is employed which does not require cure but exhibits most of the valuable performance characteristics of a crosslinked elastomer at temperatures below the softening point. The true thermoplastic nature of the present composition permits the use of rapid thermoplastic processing techniques and repeated reprocessability of scrap.

Thermoplastic polyurethane elastomers have a number of desirable properties but, unfortunately, difficulties are encountered in the processing and forming of the materials. For discussions of the problem and prior proposed solutions thereto see U.S. Pat. Nos. 3,358,052, Archer, Jr., et al., Dec. 12, 1967 (wherein the polyurethane is eventually cured through excess isocyanate groups); 3,310,604, Steingiser et al, Mar. 21, 1967; 3,385,909, Haag, Jr., May 28, 1968; and 3,384,679, Stetz, Jr., May 21, 1968. However, it has been desired to provide a more advantageous solution to the problem, and especially to overcome problems related to insufficient compatibility.

The invention is based on the unexpected discovery that by blending the thermoplastic polyurethane elastomer with chlorinated polyethylene, there are obtained novel compositions having a variety of desirable properties. It has surprisingly been found that thermoplastic polyurethane elastomers and chlorinated polyethylene ("CPE"), despite their different chemical nature, are unexpectedly compatible and form remarkably homogeneous blends. The unusual compatibility of the two polymers is demonstrated by the absence of whitening of the crease when a sheet of the blend is subjected to a bending stress, indicating that there is no phase separation or formation of micro-cracks.

The blends may be divided into two types, depending on the ratio of CPE (chlorinated polyethylene) and the thermoplastic polyurethane elastomer:

1. Polyurethane rich blends containing 10-50% by weight of CPE.
2. CPE rich blends containing 10-50% by weight of thermoplastic polyurethane elastomer.

The blends containing the higher proportion of thermoplastic polyurethane elastomer probably constitute a dispersion of CPE in a matrix of polyurethane elastomer. These blends have significantly improved mechanical processability over the thermoplastic polyurethane alone. These blends also exhibit improved mold release properties. Since polyurethane elastomers are expensive compared with CPE there is also an important reduction in material cost with adequate retention of strength properties of the polyurethane elastomer.

The blends containing the larger proportion of CPE probably constitute a dispersion of thermoplastic polyurethane elastomer in a matrix of CPE. These blends show an improvement in mechanical strength properties and low temperature flexibility over neat CPE as well as improved processing characteristics.

The objectives of the polyurethane elastomer rich blends of the invention include improved processing characteristics (calenderability, vacuum forming characteristics, broader vacuum forming temperature range, lower processing temperature, elimination of sticking to processing equipment) and reduced material cost with adequate retention of the strength properties and low temperature flexibility of polyurethane elastomers.

The objectives of the chlorinated polyethylene rich blends are to improve the strength properties, low temperature properties (flexibility), and vacuum formability of CPE, and provide compositions which are non-fogging. ("Fogging" refers to the volatilization of components of a polymer composition and condensation or deposition of this volatilized material on surrounding surfaces. A common fogging problem is that encountered in automotive crash pads. Volatile chemicals from the crash pad skin [e.g., plasticizers] volatilize and are deposited on the glass windshield of the automobile as a film which reduces visibility).

The thermoplastic polyurethane elastomer used in the invention is a conventional material (see, for example "Polyurethane Technology", by Bruins, Interscience Publishers, pages 198-200; also "Modern Plastics Encyclopedia", 1968, page 289) Examples are such polyether based polyurethanes as that made from 2 moles of polytetramethylene ether glycol, 3 moles of MDI and 1 mole of 1,4-butanediol, and polyester based polyurethanes such as are similarly derived from 1,4-butanediol-adipic acid polyester and MDI (Rubber Chemistry and Technology, Vol. 35, 1962, page 742, Schollenberger et al.). Many such products may be described as reaction products of a polymeric polyol (e.g., a polyester glycol or a polyether glycol) with an organic polyisocyanate, usually a diisocyanate, frequently along with a low molecular weight bifunctional material having two reactive hydrogens, such as a glycol or diamine (see also U.S. Pat. No. 3,462,326, Steele et al., Aug. 19, 1969, especially col. 3, lines 1 to 35; also 3,678,129, Fischer, July 18, 1972, col. 8, line 65 to col. 2, line 9 and col. 3, lines 19-30). The 350° F melt flow index is usually from 0 to 100. Unlike the polyurethane of Massoubre U.S. Pat. 3,429,948, which is a branched low molecular weight polymer having ethylenic unsaturation and is curable with peroxide, the present polyurethane is a high molecular weight material devoid of olefinic unsaturation. It does not contain available -NCO groups such as would render it curable by the action of bi-functional cross-linking agents reactive with isocyanate.

The thermoplastic polyurethane elastomers possess outstanding physical properties, including high mechanical strength, toughness, low temperature flexibility and excellent abrasion resistance. They can be formed on conventional plastic processing equipment. However, difficulties are encountered in the processing and forming of these thermoplastic polyurethanes. As indicated previously, the invention overcomes these difficulties.

The CPE employed in the invention is likewise a known material, being a resin produced by chlorination of linear polyethylene. Various forms of CPE resins employed may be described as elastomers having glass transition temperatures of −30° C. to −20° C. at chlorine content of 25-50 wt. %. Their mechanical strength properties are a function of the molecular weight of polyethylene used, the degree of residual crystallinity and the arrangement of chlorine atoms on the backbone. These materials are represented by the commercially available product known as Tyrin (trademark).

The blend of the invention may be prepared by mixing the thermoplastic polyurethane and CPE together in conventional rubber or plastic mixing machinery, such as an internal mixer of the Banbury type and/or an open mixer of the differential roll mill type, until a uniform mixture is obtained. Elevated temperatures (e.g., 300–380° F) aid the mixing, and for best results it is desirable that a temperature sufficiently elevated to flux the materials be reached during at least a part of the mixing cycle. If desired, the materials may first be dry blended, prior to mixing at elevated temperature. The mixture may include additional desired compounding ingredients, such as stabilizers, fillers or pigments, and the like.

During processing of thermoplastic polyurethane-CPE blends containing 10% or more of CPE, no sticking to the blades of Banbury or to the rolls of the mill is noticed. A considerable sticking is noticed when a thermoplastic polyurethane stock containing no, or less than 10% of, CPE is banburied or milled. In addition to sticking problems, these stocks require higher processing temperatures.

Sheets of thermoplastic polyurethane CPE blends containing 10% or more CPE can easily be vacuum formed when heated to about 350° F., while those containing no CPE require a temperature of about 380° F. It is further found that thermoplastic polyurethane sheets containing no CPE, when under heated by a few degrees, can not be vacuum formed as they are too tough to stretch around the mold and also do not retain the shape after the forming operation. Over heating of these sheets causes sagging or even melting of the material. In other words, polyurethane elastomers have a narrow and sensitive range of temperature for vacuum forming. Incorporation of 10% or more CPE not only lowers the vacuum forming temperature but also widens the range, thus making it more practical for vacuum forming operation. Similarly, a sheet made out of CPE resin alone cannot be vacuum formed due to its poor hot strength. CPE rich blends containing 10% or more of thermoplastic polyurethane are easily vacuum formable.

In addition to excellent calendering and vacuum forming properties, the compositions of the invention also display highly advantageous processing properties in other applications such as injection and compression molding, and extrusion.

The invention avoids difficulties due to migration, blooming and incompatibility problems (plate out on the calender rolls during calendering operations and stiffening of the polymer) associated with certain prior attempted solutions to the problem of improving the processability of polyurethane elastomers.

Specific shaped articles which may be manufactured using out composition include: automotive crash pad and bumper cover skins; seating structures; coated fabrics; hose; shoe soles; belting, etc.

The following examples, in which all quantities are expressed by weight, will serve to illustrate the practice of the invention in more detail.

EXAMPLE 1

The thermoplastic polyurethane elastomer employed in this example may be a reaction product of one equivalent of polytetramethylene ether glycol (1000 molecular weight), and two equivalents of butanediol-1,4 with diphenyl methane-p,p'-diisocyanate, the ratio of isocyanate to polyol blend being such as to result in material with a melt flow index of 50 to 100. The product has a molecular weight of the order of about 50,000. It may have a Shore A hardness of 90, a tensile strength of 7500 psi, a modulus of 1150 psi at 100% elongation, an elongation at break of 550%, an elongation set of 65%, a trouser tear of 470 pli, and a specific gravity of 1.14. It may be dried in an air circulating oven for 3 hours at 230° F. prior to use.

The chlorinated polyethylene employed may be a resinous product having a chlorine content of 48% and a melt viscosity of $19 \times 10^3$ poises; it is an elastomeric material (tension set 14%, ASTM D 412 ), having a Shore A hardness of 65, a specific gravity of 1.25 and a crystallinity less than 2%, commercially available as Tyrin (trademark) QX2243.25. It is also dried for 3 hours at 230° F. in a circulating air oven prior to use.

Fifty g. of the dried CPE is dry blended with a conventional stabilizer system consisting of 1.0 g. of barium/cadmium laurate stabilizer (Synpron 763, trademark), 1.5 g. of bis (3,4-epoxy-6-methylcyclohexylmethyl)adipate (Cib a CY 178, trademark) and 0.28 g. of tri (nonylated phenyl) phosphite (Mark C, trademark). The dry mix is masticated in a Banbury mixer for one minute at 350° F. At this stage 350 g. of the dried thermoplastic polyurethane elastomer is introduced and blended for an additional 5 minutes at 42 rpm and 350° F. The stock is discharged, fluxed on a two roll laboratory mill heated to 320° F. for 3 minutes and sheeted out to a thickness of about 0.04 inch. Mixing and sheeting operations are smooth and no sticking of material to the rotors of Banbury or rolls of the mill is noticed. The sheeted material is heated using radiant heat to a surface temperature of 350° F. and shaped into an article by vacuum forming operation. On corners and edges the sheet is drawn to a thickness of about 0.006 in. without any puncture or break, demonstrating good hot strength, drawability and vacuum formability of the blend.

There is considerable sticking of material to the rotors of Banbury when the thermoplastic polyurethane elastomer is used alone. Also, the sheeting out on a two roll mill is very difficult due to the adhering tendency of the polymer to the rolls of the mill. The sheeted material when heated to 350° F. by radiant heat cannot be vacuum formed due to the toughness and lack of drawability at this temperature.

EXAMPLE 2

Repeating the processing procedure of Example 1, a thermoplastic polyurethane CPE blend containing 25% CPE is prepared. The sheeted material is heated to a surface temperature of 340° F. and vacuum formed. The fabricated article has good shape retention.

EXAMPLE 3

Thermoplastic polyurethane CPE blends containing different amounts of CPE are prepared using the procedure described in Example 1. All these blends are easy to process without any sticking to the surface of equipment. The fabrication of these blends into shaped articles by vacuum forming operation is smooth. Data in Table I show an adequate retention of the mechanical properties of the polyurethane, in polyurethane rich blends.

EXAMPLE 4

Repeating the processing procedure of Example 1 a thermoplastic polyurethane-CPE blend containing 75% of CPE is prepared. The calendered sheet from this blend is smooth and easily vacuum formed. On the other hand, CPE by itself fails to produce a smooth calendered sheet and tears off around the corners of the mold during vacuum forming operation. This clearly demonstrates that the incorporation of thermoplastic polyurethane in CPE not only eliminates the requirement of a plasticizer and a lubricant for smooth calenderability of CPE but also improves its hot stength required for good vacuum formability.

Physical data reported in Table I, for blend No. 7, show an improvement in mechanical strength properties of this blend over neat CPE. Further, the blend does not fail when subjected to a Masland cold impact test even at −50° F. while neat CPE samples fail at −30° F., demonstrating an improvement in low temperature properties, over CPE.

TABLE I

PROPERTIES OF THERMOPLASTIC POLYURETHANE/CPE BLENDS

| BLEND NO. | THERMOPLASTIC POLYURETHANE % | CPE % | $M_{100}$ psi | $M_{300}$ psi | ASTM D-412 (2"/min.) Tensile at break psi | Elongation at break % | Tear Die-C pli | Shore A | % Compression Set ASTM D-395 Method B RT | 158° F. |
|---|---|---|---|---|---|---|---|---|---|---|
| 1 | 100 | 0 | 1350 | 2300 | 6800 | 680 | 542 | 91 | 20 | 59 |
| 2 | 87.5 | 12.5 | 1250 | 2100 | 6440 | 660 | 495 | 88 | 20.5 | 61 |
| 3 | 75.0 | 25.0 | 1100 | 1875 | 5600 | 600 | 443 | 86 | 26 | 64 |
| 4 | 62.5 | 37.5 | 900 | 1650 | 5100 | 575 | 377 | 84 | 33 | 67 |
| 5 | 50.0 | 50.0 | 750 | 1350 | 4800 | 575 | 304 | 81 | 38 | 69 |
| 6 | 37.5 | 62.5 | 575 | 1100 | 3550 | 540 | 243 | 77 | 44 | 76 |
| 7 | 25.0 | 75.0 | 375 | 775 | 2100 | 530 | 191 | 73 | 50 | 91 |
| 8 | 12.5 | 87.5 | 250 | 550 | 1975 | 540 | 133 | 69 | 53 | 100 |
| 9 | 0 | 100 | 175 | 300 | 1875 | 550 | 95 | 66 | 59 | 100 |

We claim:
1. A method of making a shaped article comprising the steps of blending
   a. from 10 to 90% by weight of a high molecular weight thermoplastic polyuethane elastomer devoid of ethylenic unsaturation and free —NCO groups having a 350° F. melt flow index of from 0 to 100 which is a reaction product of polytetramethylene ether glycol, butanediol-1,4 and diphenylmethane-p,p'-diisocyanate, and
   b. correspondingly from 90 to 10% by weight of an elastomeric chlorinated polyethylene having a glass transition temperature of −30° C. to −20° C. and a chlorine content of 25–50% by weight,
the resulting blend being capable of being reprocessed and forming the resulting blend into a shaped article using a thermoplastic processing technique.

* * * * *